(12) United States Patent
Van Landeghem et al.

(10) Patent No.: US 11,014,729 B2
(45) Date of Patent: May 25, 2021

(54) MULTI-LAYER WEB AND PROCESS FOR FORMING SCORED LIDDING FILM FOR BLISTER PACKAGES

(71) Applicant: Tekni-Plex, Inc., Wayne, PA (US)

(72) Inventors: Robin Van Landeghem, Sylvania, OH (US); Philip Bourgeois, Perrysburg, OH (US)

(73) Assignee: Tekni-Plex, Inc., Wayne, PA (US)

( * ) Notice: Subject to any disclaimer, the term of this patent is extended or adjusted under 35 U.S.C. 154(b) by 0 days.

(21) Appl. No.: 16/405,211

(22) Filed: May 7, 2019

(65) Prior Publication Data

US 2019/0263549 A1    Aug. 29, 2019

Related U.S. Application Data

(63) Continuation of application No. 14/637,764, filed on Mar. 4, 2015, now abandoned.

(51) Int. Cl.
*B65D 75/32* (2006.01)
*B32B 7/05* (2019.01)
(Continued)

(52) U.S. Cl.
CPC .............. *B65D 75/327* (2013.01); *B32B 3/04* (2013.01); *B32B 3/30* (2013.01); *B32B 7/05* (2019.01); *B32B 27/08* (2013.01); *B32B 27/306* (2013.01); *B32B 27/308* (2013.01); *B32B 27/32* (2013.01); *B32B 27/36* (2013.01); *B65B 47/00* (2013.01); *B32B 2250/03* (2013.01); *B32B 2250/24* (2013.01); *B32B 2270/00* (2013.01);
(Continued)

(58) Field of Classification Search
CPC ........... B65B 11/52; B65B 47/00; B32B 7/05; B32B 3/04; B32B 3/30; B32B 27/306; B32B 27/308; B32B 27/08; B32B 27/32; B32B 27/36; B32B 2270/00; B32B 2307/31; B32B 2307/582; B32B 2307/702; B32B 2307/704; B32B 2307/732; B32B 2307/738; B32B 2435/00; B32B 553/00; B32B 2250/24; B32B 2435/02; B32B 2439/40
See application file for complete search history.

(56) References Cited

U.S. PATENT DOCUMENTS 3,759,371 A    9/1973    Marks
4,375,494 A *  3/1983    Stokes .................... B32B 27/08
                                                    428/323

(Continued)

OTHER PUBLICATIONS

Int'l. Preliminary Report on Patentability dated Jun. 22, 2017 in corresponding Int'l. Appln. No. PCT/US2016/016266.
(Continued)

*Primary Examiner* — Michael Zhang
(74) *Attorney, Agent, or Firm* — Polsinelli, P.C.

(57) ABSTRACT

Multi-layer web and mechanical scoring process for forming lidding film for push through blister packages. The web is configured to resist the tensile forces encountered during manufacturing processes, including slitting, rewinding and heat sealing processes. A simplified web conversion process for creating mechanically scored lidding film for blister packages is provided at reduced investment and operational costs compared to prior art systems.

15 Claims, 10 Drawing Sheets

(51) Int. Cl.
*B32B 3/04* (2006.01)
*B32B 3/30* (2006.01)
*B32B 27/30* (2006.01)
*B32B 27/08* (2006.01)
*B32B 27/32* (2006.01)
*B32B 27/36* (2006.01)
*B65B 47/00* (2006.01)

(52) U.S. Cl.
CPC ..... *B32B 2307/31* (2013.01); *B32B 2307/582* (2013.01); *B32B 2307/702* (2013.01); *B32B 2307/704* (2013.01); *B32B 2307/732* (2013.01); *B32B 2307/738* (2013.01); *B32B 2435/00* (2013.01); *B32B 2435/02* (2013.01); *B32B 2439/40* (2013.01); *B32B 2553/00* (2013.01); *B65D 2575/3227* (2013.01)

(56) References Cited

U.S. PATENT DOCUMENTS

| | | | | |
|---|---|---|---|---|
| 5,236,749 | A | * | 8/1993 | Ewing .................. B65D 75/36 428/35.2 |
| 5,360,116 | A | | 11/1994 | Schmiletzky |
| 5,522,506 | A | * | 6/1996 | Roulin ................ B65D 75/327 206/531 |
| 6,006,913 | A | | 12/1999 | Ludemann et al. |
| 8,079,475 | B2 | | 12/2011 | McArthur et al. |
| 8,479,921 | B2 | | 7/2013 | Ingraham |
| 2005/0208282 | A1 | * | 9/2005 | Wood, Jr. ............ B32B 37/1207 428/216 |
| 2005/0284789 | A1 | * | 12/2005 | Carespodi .............. B32B 15/09 206/461 |
| 2007/0227932 | A1 | | 10/2007 | Bobbett et al. |
| 2008/0073240 | A1 | | 3/2008 | Bowers et al. |
| 2009/0145800 | A1 | | 6/2009 | Bowers et al. |
| 2009/0188827 | A1 | | 7/2009 | McArthur et al. |
| 2011/0262589 | A1 | * | 10/2011 | Safarik .................... B32B 7/05 426/5 |
| 2012/0248005 | A1 | | 10/2012 | Bergey |
| 2013/0008825 | A1 | * | 1/2013 | McArthur ............... B65B 9/045 206/531 |
| 2013/0306511 | A1 | | 11/2013 | Branyon et al. |

OTHER PUBLICATIONS

Written Opinion of the Int'l. Preliminary Examining Authority dated Mar. 9, 2017 in corresponding application PCT/US2016/016266.

International Search Report for MCT/US2016/016256 dated May 9, 2016.

* cited by examiner

MULTI-LAYER WEB AND PROCESS FOR FORMING SCORED LIDDING FILM FOR BLISTER PACKAGES

FIELD OF THE INVENTION

The present invention relates to lidding film for a blister package and more particularly to a multi-layer web and mechanical scoring process for forming such lidding film.

BACKGROUND OF THE INVENTION

Blister packaging is known for receiving a product, e.g., in tablet or powder form, wherein each of the individual recesses or compartments of the base substrate can be provided with one product or the like and the packaging can then be sealed with a cover, e.g., in the form of a lidding film. The lidding film is sealed to the base substrate on plane surfaces provided between the recesses and along recesses outer edges of the base. As a result, the packaged material is sealed tight against the exterior environment and each individual product in the various compartments is mutually separated from one another. Packaging of this type is known as "push-through" blister packaging when the product in an individual recess can be removed by manually pressing on the base substrate (below the recess) and pushing the product through the lidding film.

Blister packages are known having a base section made of plastic and a cover that includes an aluminum foil or an aluminum foil containing composite. When such packaging material is recycled, waste products from the different materials are obtained, some of which are still adhesively or weld bonded to one another. This poses difficulty in recycling of such packaging materials.

One type of all-plastic blister package has a peelable (as opposed to push through) heat seal lid. The opening action (removing the peelable film) is generally considered less user friendly (e.g., more difficult for seniors) compared to the push-through lidding films. Also, the peelable heat seal formulations are generally of different materials than the base, which impacts recyclability.

Another type of lidding film for blister packages, consisting of mineral filled thermoplastic polymer components, is described in U.S. Pat. Nos. 5,932,338 and 6,006,913. One lidding film of this type is commercially available from Etimex GMBH (http://www.etimex-pp.com/), under the "Purelay" brand. These films are devoid of metal foils, and possess frangible push-through characteristics. However, these mineral based films are known to be rigid or brittle, and difficult to process during slitting, rewinding and heat sealing. While the push-through force for a given package design can theoretically be tailored by altering the mineral filler content, the range for such adjustments is limited. At low mineral filler content an excessive push-through force is generally required to allow the contents to break through the film. At higher mineral filler content, the film may be too brittle to handle during the slitting, rewinding and heat sealing processes and may prematurely fracture during such handling and conversion processes.

An all-polymer lidding film, devoid of metal foils typically requires scoring of the film to enable the push-through characteristic. Scoring can be performed either mechanically or by laser scoring. Laser scoring is significantly more expensive and typically costs multiple times per unit cost of a mechanical scoring process.

Thus there is an ongoing need for materials and processes for making push through blister packaging that overcome the limitations of the prior art.

SUMMARY OF THE INVENTION

The present invention provides a multi-layer web and mechanical scoring process for forming lidding film for push through blister packages. The web is configured to resist the tensile forces encountered during manufacturing processes, including slitting, rewinding and heat sealing processes. A simplified web conversion process for creating mechanically scored lidding film for blister packages is provided at reduced investment and operational costs compared to prior art systems. These and other advantages of the invention are described below with respect to various embodiments of the invention.

In one embodiment of the present invention a multi-layer web is provided comprising: a multi-layer web of film windable on a core and adapted to be scored and slit to form scored lidding film for blister packages, the film being formed without a metal layer and including an inner seal layer and an outer layer comprising different thermoplastic polymer materials, the inner seal layer configured to form a thermal weld seal with a base substrate of a blister package, while the outer layer has a central scored area configured to rupture and release a product contained in a recess of a base substrate without breaking the weld seal, the web being unwound from the core in a machine M direction transverse to a central longitudinal axis CL of the core on which the web is wound, the central scored area extending between opposing first and second non-scored edge grip areas aligned in the M direction, the central scored area being sized to cover a plurality of recesses in a base substrate of a blister package without the need for registering the scored area with individual recesses, the central scored area being formed by passing the web against a scoring roller to mechanically score fully or partially through the outer layer without scoring the inner seal layer, the opposing first and second edge grip areas being non-scored and each of a minimum width configured to provide structural integrity to the web during winding and unwinding of the web onto or from the core, and the non-scored edge grip areas being slit to form a scored lidding film for blister packages, wherein the central scored area comprises 75% to 99% of a total width of the slit lidding film and the non-scored edge grip areas together comprise 1% to 25% of the total width of the slit lidding film.

In another embodiment of the present invention, a multi-layer web is provided, wherein the central scored area comprises 80% to 99% of the total width of the slit lidding film.

In another embodiment of the present invention a multi-layer web is provided, wherein the central scored area comprises 85% to 99% of the total width of the slit lidding film.

In another embodiment of the present invention a multi-layer web is provided, wherein the scoring depth is between and 10% and 90% of the outer layer thickness.

In another embodiment of the present invention a multi-layer web is provided, wherein the scoring depth is between 20% and 80% of the outer layer thickness.

In another embodiment of the present invention a multi-layer web is provided, wherein the scoring depth is between 30% and 70% of the outer layer thickness.

In another embodiment of the present invention a multi-layer web is provided, wherein the scoring comprises spaced apart arrow shaped scored formations aligned in the M direction.

In another embodiment of the present invention a multi-layer web is provided, wherein the inner layer comprises 5% to 50% of the total lidding film thickness and the outer layer comprises 50% to 95% of the total lidding film thickness.

In another embodiment of the present invention a multi-layer web is provided, wherein the inner layer comprises 5% to 40% of the total lidding film thickness and the outer layer comprises 60% to 95% of the total lidding film thickness.

In another embodiment of the present invention a multi-layer web is provided, wherein the inner layer comprises 5% to 30% of the total lidding film thickness and the outer layer comprises 70% to 95% of the total lidding film thickness.

In another embodiment of the present invention a multi-layer web is provided, wherein the lidding film is from 10 to 100 micron in thickness.

In another embodiment of the present invention a multi-layer web is provided, wherein the lidding film is from 15 to 90 micron in thickness.

In another embodiment of the present invention a multi-layer web is provided, wherein the lidding film is from 20 to 80 micron in thickness.

In another embodiment of the present invention a multi-layer web is provided, wherein the scoring is uniformly distributed in the central area.

In another embodiment of the present invention a multi-layer web is provided, wherein the scoring width is from 5 to 100 microns.

In another embodiment of the present invention a lidding film is formed from the multi-layer web, combined with a thermoformed base substrate, the inner layer being weld sealed to the base substrate.

In another embodiment of the present invention a lidding film and base substrate is cut to form a single blister package.

In another embodiment of the present invention a lidding film and base substrate is made from materials compatible in recycling.

In another embodiment of the present invention a multi-layer web is provided, wherein the multi-layer web is formed by co-extrusion of the inner seal layer and outer layer, extrusion coating of the inner seal layer onto the outer layer, or coating of the the inner seal layer onto the outer layer via solvent, water or solventless coating processes or by wet or dry bond lamination of the inner seal layer to the outer layer.

In another embodiment of the present invention a multi-layer web is provided, wherein the outer layer comprises polyester or polyolefin.

In another embodiment of the present invention a multi-layer web is provided, wherein the outer layer comprises polyethylene terephthalate or polypropylene, including homopolymers, copolymers and blends thereof.

In another embodiment of the present invention a multi-layer web is provided, wherein the inner layer comprises ethylene vinyl acetate copolymers, polyester, polyethylene, polypropylene, or acrylic, including homopolymers, copolymers and blends thereof.

In another embodiment of the present invention a multi-layer web is provided, wherein the outer layer comprises a semi crystalline polyethylene terephthalate polymer or copolymer and the inner layer comprises an amorphous polyethylene terephthalate copolymer.

In another embodiment of the present invention, a method of forming blister packages is provided comprising steps of: providing a master roll of the multi-layer web wound on a core, the master roll configured to form scored lidding film for multiple blister packages across a width W of the master roll transverse to the machine M direction,
unwinding a length of the master roll from the core in the M direction,
passing the length of the master roll against a rotating scoring roller to mechanically score only the outer layer of the film, wherein multiple central scored areas are formed across the width of the master roll between non-scored areas,
slitting the master roll along the M direction in the non-scored areas between central scored areas to form multiple slit rolls of scored lidding film, each slit roll being wound onto a core unwinding a slit roll of lidding film from the core and attaching a series of base substrates along a length of the unwound slit roll to form a series of blister packages.

In another embodiment of the present invention, the method of forming blister packages, further comprises cutting individual blister packages from the series of blister packages.

In another embodiment of the present invention an apparatus for forming blister packages is provided including a plurality of stations for in-line forming of a series of blister packages, the stations comprising:
a base forming station for unwinding a roll of base film from a core in a machine direction M, followed by heating and thermoforming the base film to form a series of thermoformed base substrates with product recesses in the base film aligned along the M direction,
a filling station for dispensing product into the recesses of the series of base substrates,
a roll of scored lidding film on a core having a series of central scored areas between nonscored areas aligned along a machine direction M, a thermal sealing station, receiving the series of filled base substrates and a length of the scored lidding film unwound from the core in the M direction wherein the inner layer of the scored lidding film is sealed to each filled base substrate with the central scored area over the recesses of the substrate to form a series of sealed blister packages, and
a cutting station for cutting individual blister packages from the series.

BRIEF DESCRIPTION OF THE DRAWINGS

The following figures illustrate various embodiments of the invention in more detail.

DETAILED DESCRIPTION OF THE INVENTION

Figure 1:
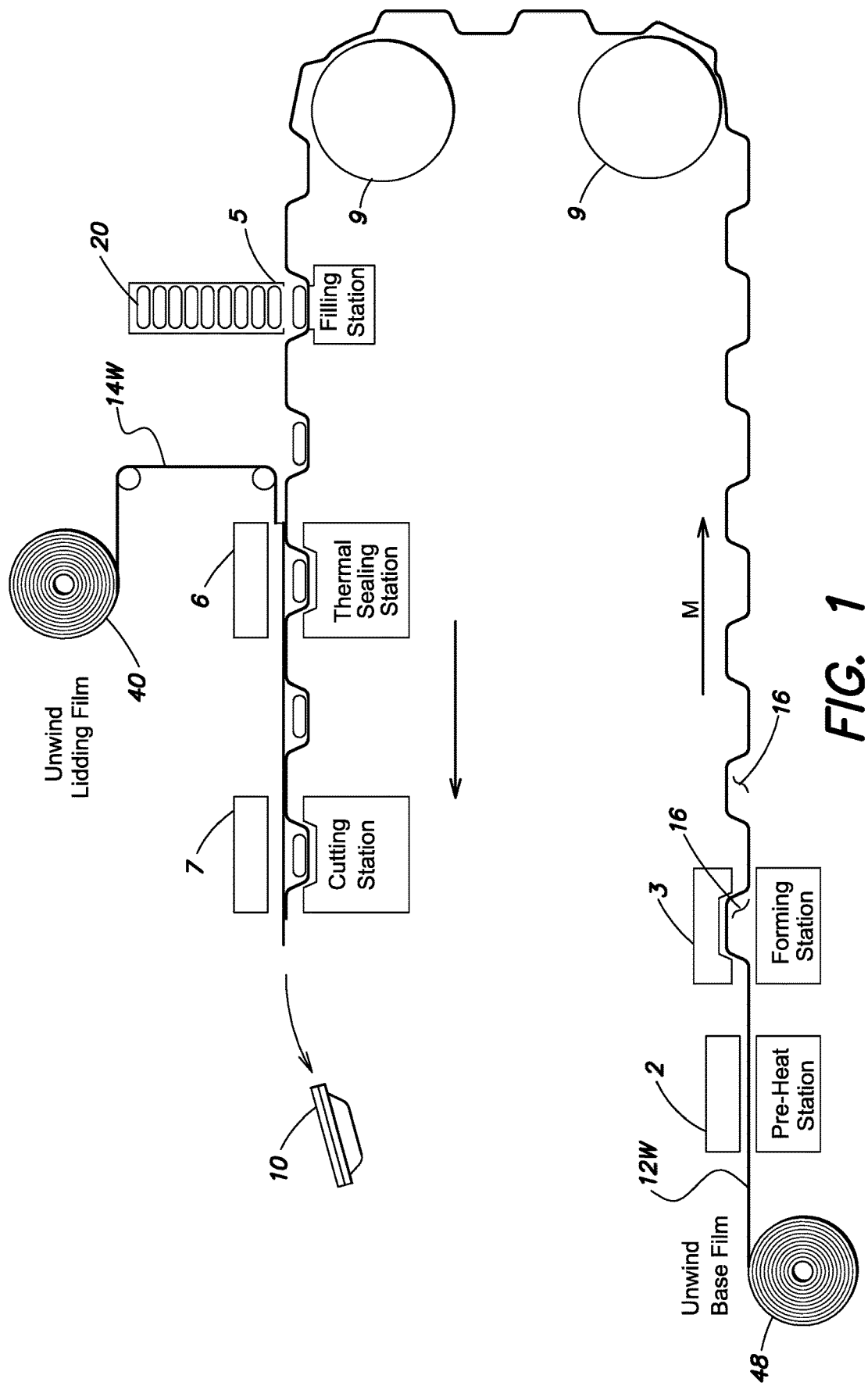
FIG. 1 is a schematic view of a blister package assembly apparatus and process according to one embodiment of the invention.

FIG. 1 illustrates one embodiment of a process for making a push through blister package, of the type illustrated in FIGS. 2 and 5-6, according to one embodiment of the invention.

Figure 2A:
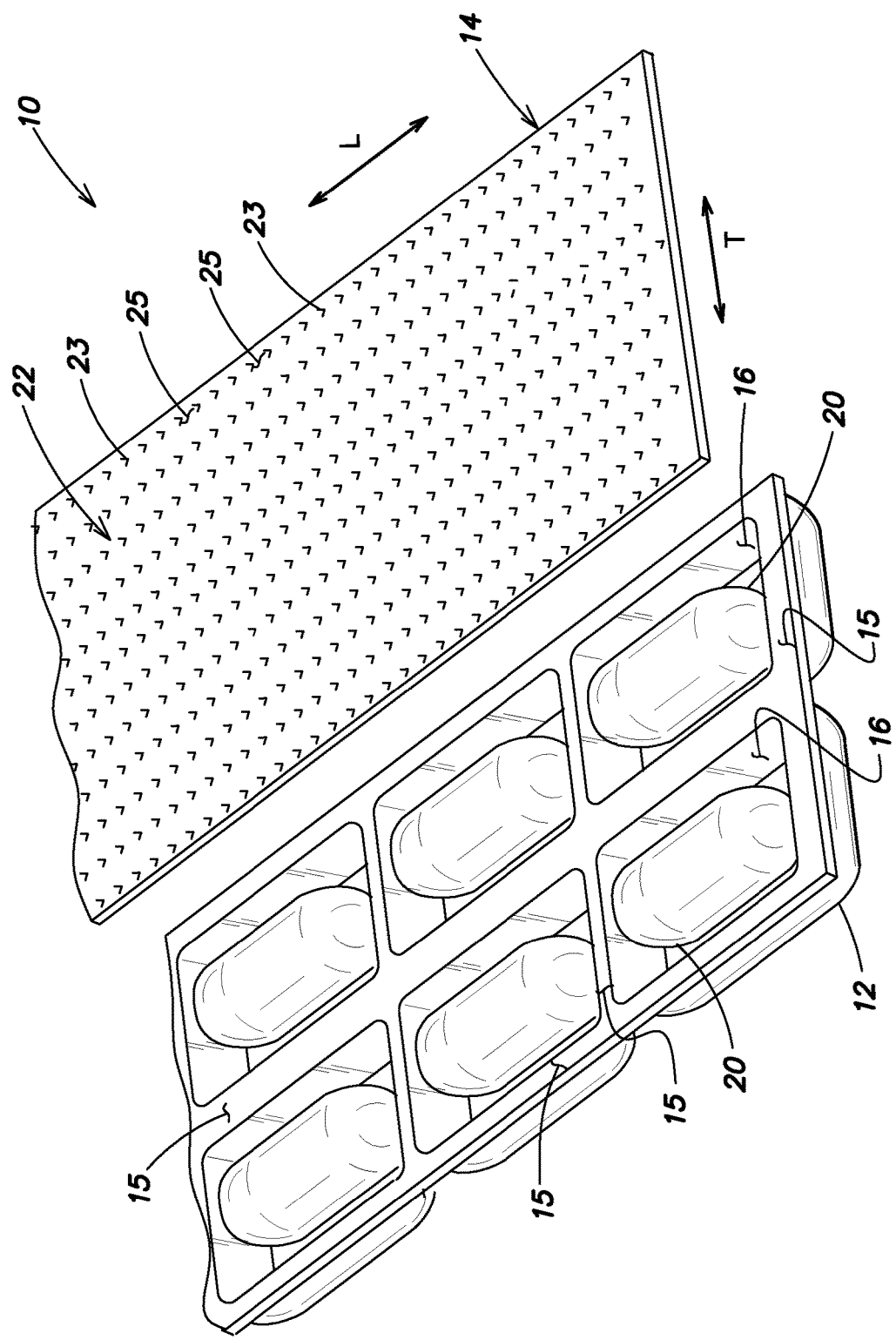
FIG. 2A is an exploded perspective view of a base substrate and scored lidding film for forming a push through blister package according to one embodiment.
Figure 2B:
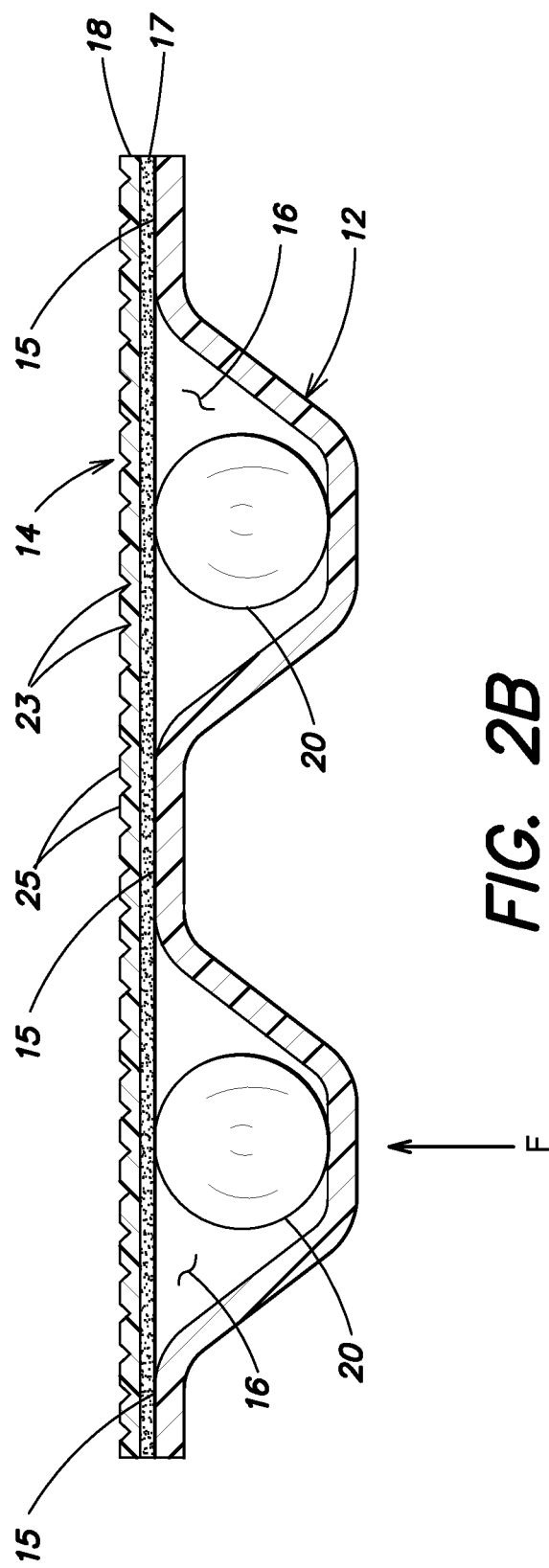
FIG. 2B is a cross sectional view of an assembled blister package from the components of FIG. 2A, showing an individual product in each recess of the base substrate and the scored lidding film attached to the base substrate.
Figure 6A:
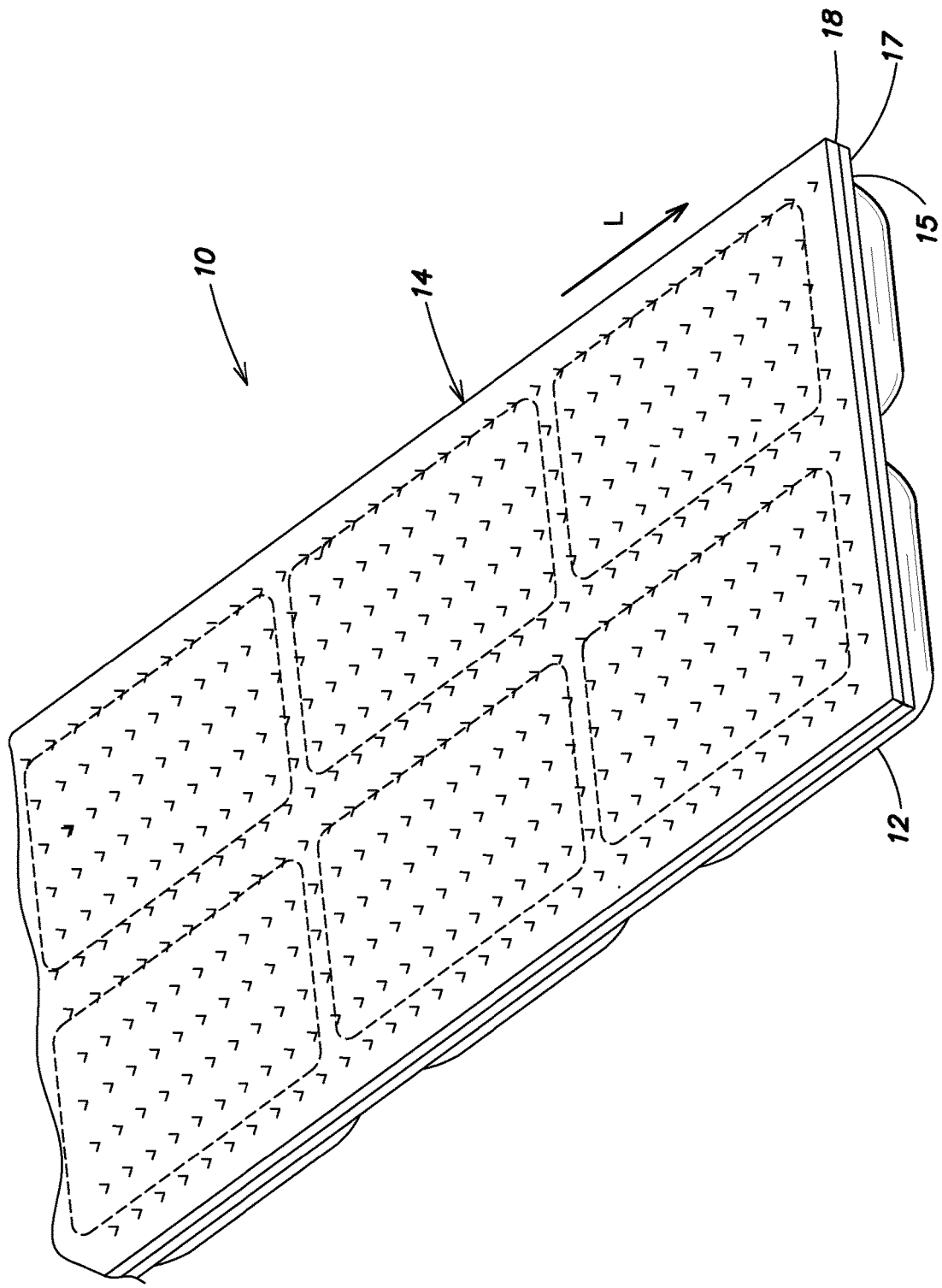
FIG. 6A is a perspective view of an assembled blister package of the type shown in FIGS. 2A-2B, prior to cutting (removing) the unscored edge areas of the lidding film and substrate below.
Figure 6B:
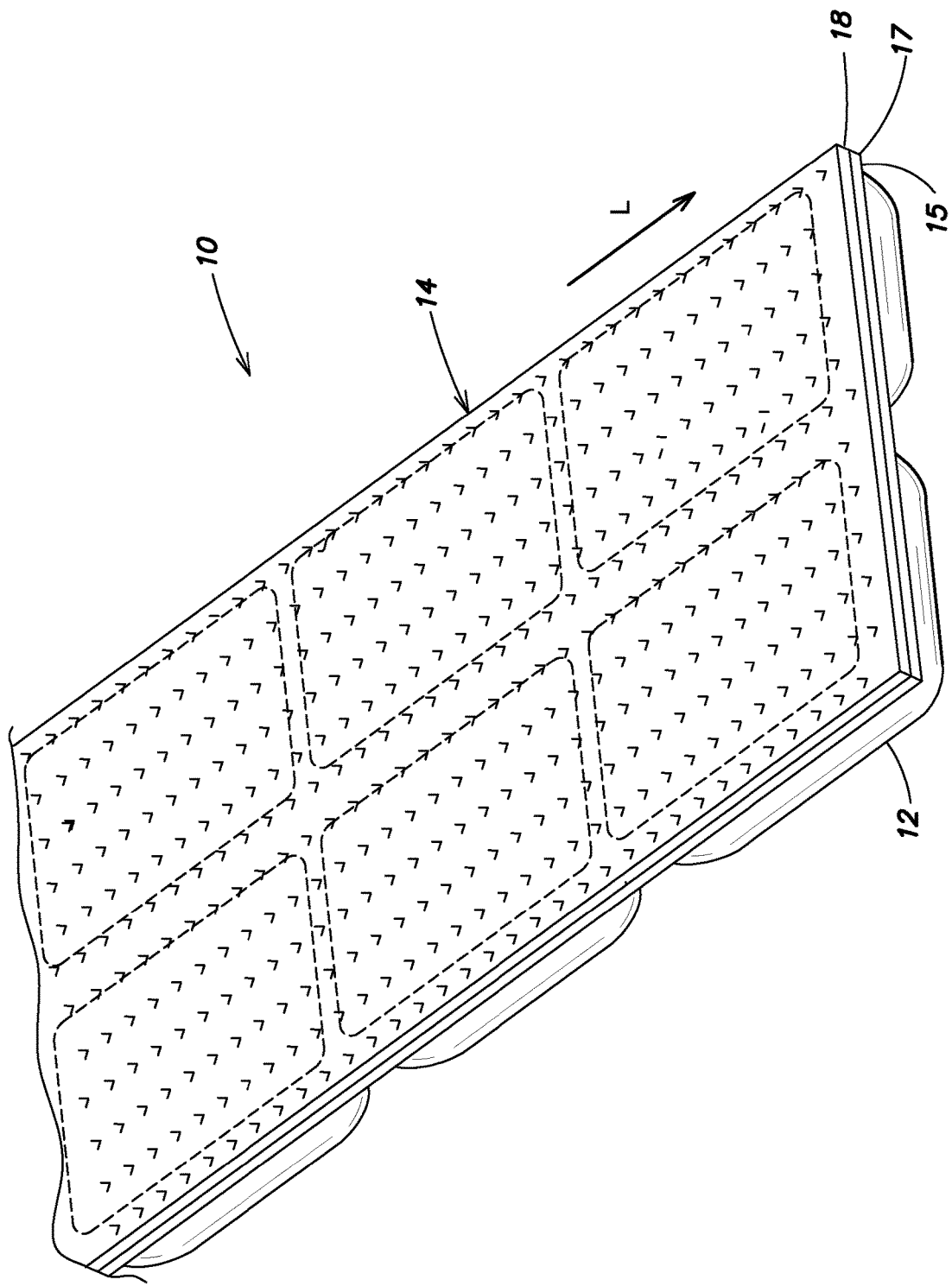
FIG. 6B is the final package (with the unscored edge areas removed)

In FIG. 1 there is schematically shown an inline forming and assembly apparatus for making a series of blister packages, A final blister package 10 is shown exiting the final cutting station 7. The packages are formed by unwinding a base film (web 12W) from a roll 48 on a core, forming and then filing recesses in the base film at stations 2-5 and then attaching a lidding film (web 14W), unwound from roll 40 on a core, to the formed and filled base substrate film at station 6, followed by cutting the final package at station 7. The final cut package, comprising a base substrate 12 and a scored lidding film 14 is shown in FIGS. 2A-2B and FIG. 6B. FIG. 6A shows the attached lidding film and base substrate prior to cutting.

More specifically, beginning at the bottom left hand side of FIG. 1, a web 12W of base film is unwound from roll 48 on a core and heated at pre-heat station 2; the base film is then thermoformed at forming station 3 to form recesses or hollows 16 in a series of base substrates (along machine direction M). The formed series of base substrates is then fed around rollers 9 to a filling station 5 where each recess 16 is filled with product 20. The filled base film 12W is then aligned with the web 14W of lidding film, being unwound from roll 40 on a core, wherein the open end of each filled recess 16 is brought into alignment with the lidding film web 12W at a thermal sealing station 6 (or similar station) for securing the lidding film to the base substrate. The lidding film is sealed to top planar areas 15 in between and around the recesses of the base to close each recess 16 and seal the product 20 therein (see FIG. 2). The combined lidding film and base substrate is then cut and separated as desired at cutting station 7 to define individual blister packages 10 each having a desired number of products in the thermoformed recesses (e.g., as shown in FIGS. 2A-2B and 6B). Thus at station 7 there are edge trim areas of both the lidding film and underlying base substrate removed to form the final cut blister package 10.

The schematic of FIG. 1 is provided to show the steps of an assembly process for a finished package according to one embodiment. The steps may be performed together or as part of separate operations. For example, the lidding film 14 may be printed, coated or die cut as part of one operation or separate operations. As described further in regard to FIGS. 3-4 and 7, each roll of lidding film 40 may be slit from a master web roll 30 that has been scored, and then slit into individual slit lidding film rolls (such as roll 40 in FIG. 1). Other operations may be performed within the conversion process as known to the skilled person.

FIG. 2A illustrates, in exploded view, the components of a blister package 10 according to one embodiment. The package 10 includes a base substrate 12 and a scored lidding film 14. The base 12 includes a plurality of recesses 16 that are arranged in an aligned pattern or array (e.g., rectangular array of rows and columns), with each recess 16 separated by a top planar sealing flange 15. Each recess 16 retains product 20. The blister package may be formed with any number of recesses, and each recess may hold an individual product or multiple products or a quantity of loose product, such as a powder or granular material. A series of separation lines (not shown) may be provided within the sealing flange 15, between adjacent recesses, or group of multiple recesses, as desired, to permit separation of a portion of the base substrate from the remainder.

The lidding film 14 is joined to the base substrate 12 of a package as shown in the cross sectional view of FIG. 2B. The lidding film 14 is joined to the sealing flange 15 by a thermal weld seal, such that each individual recess 16 containing product 20 is covered and closed. A score pattern 22 of scored formations 23 (FIGS. 2A-2B) is formed only in an outer layer 18 of the multi-layer lidding film 14. The score pattern 22 is provided for the initiation and propagation of the tear within the lidding film 14 overlying the recess 16, upon application of a force against the base material forming the recess 16, and the product 20 retained therein. In FIG. 2B, the force is represented by the arrow F, with the resulting tear in the lidding film 14 occurring in an area of the scored lidding film 14 over the recess 16, for releasing the previously sealed product 20. As such, the lidding film is designed to tear above a recess, without breaking the weld seal between the lidding film and base substrate.

Figure 5A:
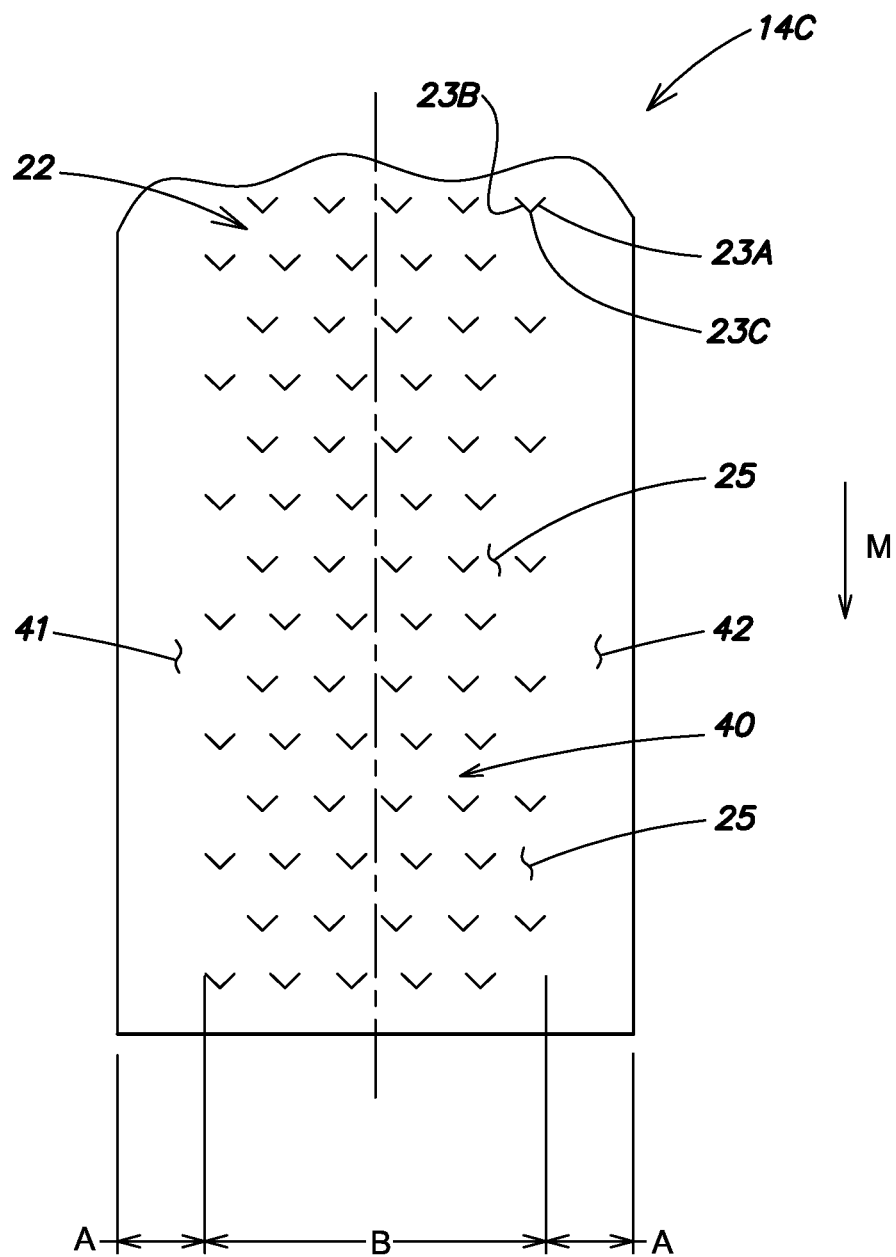
FIG. 5A is top plan view of a section of one slit roll of scored lidding film having a central scored area with an array of scored arrow-shaped formations, extending between opposing first and second edge grip areas that are not scored.

As shown in FIGS. 2, 5 and 6, the score pattern 22 in the disclosed embodiment includes a plurality of individual scored formations 23, separated by non-scored areas 25 surrounding each scored formation. Each scored formation in this example is shaped like an arrow head, including two generally straight lines 23A and 23B, joined at an apex 23C (FIG. 5A). The apexes of the scored formations 23 all point in the machine direction M in this example (same as the lengthwise package direction L). The individual scored formations may be aligned in rows and columns, which are equidistantly spaced from one another, where each row is offset with respect to the adjacent rows. Other patterns (e.g., irregular spacing between scored formations) may be used. The shape of the scored formation 23 and the size, depth, width of scoring lines 23A, 23B and number of scored formations across the width of the blister package, and/or across the width of each recess, can be varied for purposes of customizing the package based on the materials used for the base film and lidding film, the contents (product enclosed), and the desired push-through force.

As described in greater detail below, the scored formations 23 extend across all of the recesses 16 of the lidding film in the final package 10 such that no registration (alignment) of the scored formations of the lidding film and the recesses is required. This greatly simplifies production and assembly.

Figure 5B:
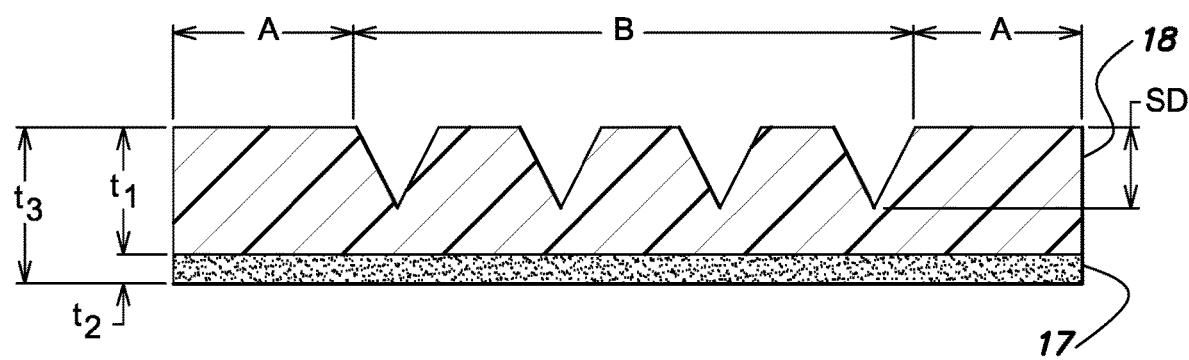
FIG. 5B is a cross sectional view of the scored lidding film of FIG. 5A.

As shown in cross section in FIGS. 2B and 5B, the lidding film 14 is a multi-layer film comprising inner and outer film layers of different thermoplastic polymer materials, and without a metal layer. An inner seal layer 17 of the lidding film 14 forms a weld seal bond to the top surface (the sealing flange 15) of the base substrate 12. The inner seal layer 17 is formed of a thermoplastic polymer material that softens at a lower melt temperature than the outer layer 18, in order to bond the inner layer to the base substrate. The inner layer material for forming the weld (non-peelable) seal may comprise any of various known sealing materials based on, for example, ethylene vinyl acetate (EVA), polyester, polyolefin, acrylic, and others, including co-polymers, homopolymers and blends thereof. The outer layer 18 of the lidding film is a heat resistant layer, compared to the inner layer. The outer layer resists softening and maintains structural integrity for handling of the lidding film composite when the inner layer is softened for weld sealing to the base substrate. The outer layer may comprise any of various thermoplastic polymer materials, such as polyester, (e.g., polyethylene terephthalate PET), polyolefin (e.g., polypropylene or polyethylene), including homopolymers, co-polymers, and blends thereof. As used herein, the different thermoplastic polymer materials of the inner and outer film layers 17, 18 includes polymers of different chemistry or polymers of the same chemistry (thermoplastic family, such as polyester) but having different characteristics (e.g., crystalline, semi-crystalline, or amorphous) and/or comprising homopolymers, copolymers of blends thereof. In one example the outer layer comprises homopolymer polypropylene and the inner layer comprises polypropylene copolymer. In another example the outer layer comprises semi-crystalline polyethylene terephthatlate (PET) and the inner layer comprises an amorphous polyethylene terephthalate copolymer.

Also, the lidding film materials and base substrate materials are preferably compatible in commercial recycling streams. For example, both the base substrate and lidding film materials may be from the same thermoplastic family (e.g., polypropylene, or polyester). Materials that are compatible in recycling means materials of the same thermoplastic family that are melt compatible.

Figure 3:
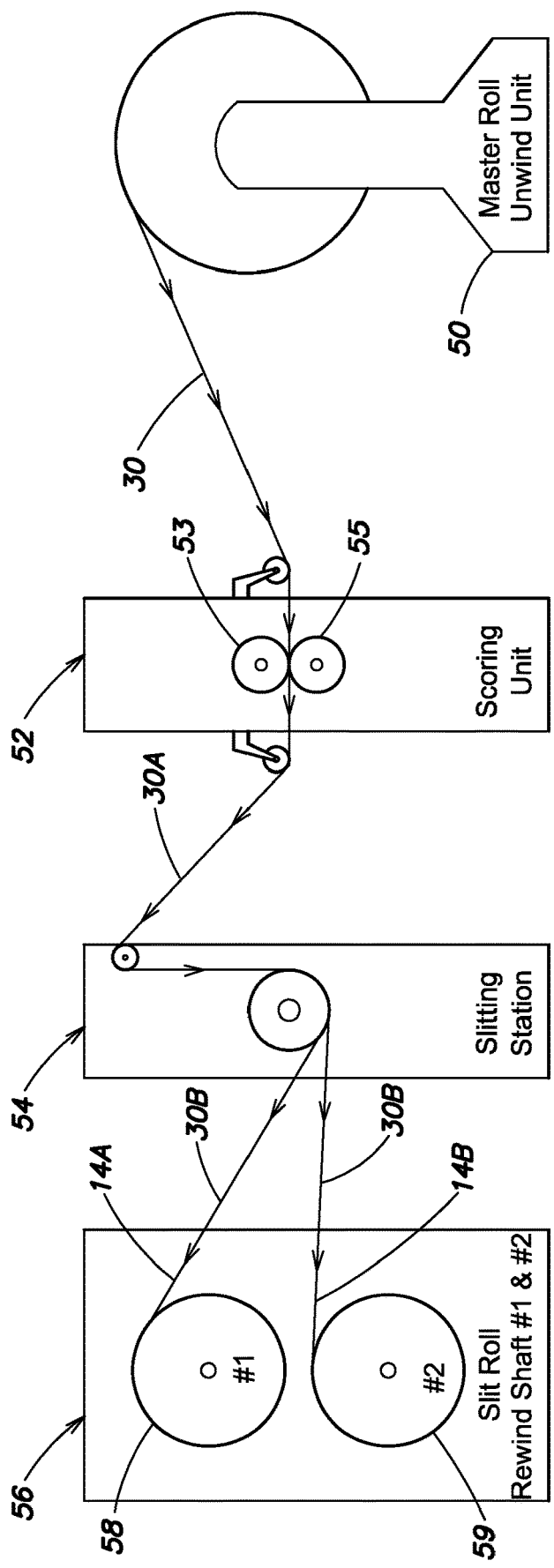
FIG. 3 is a schematic view of a scoring, slitting, and rewinding conversion process according to one embodiment.
Figure 4:
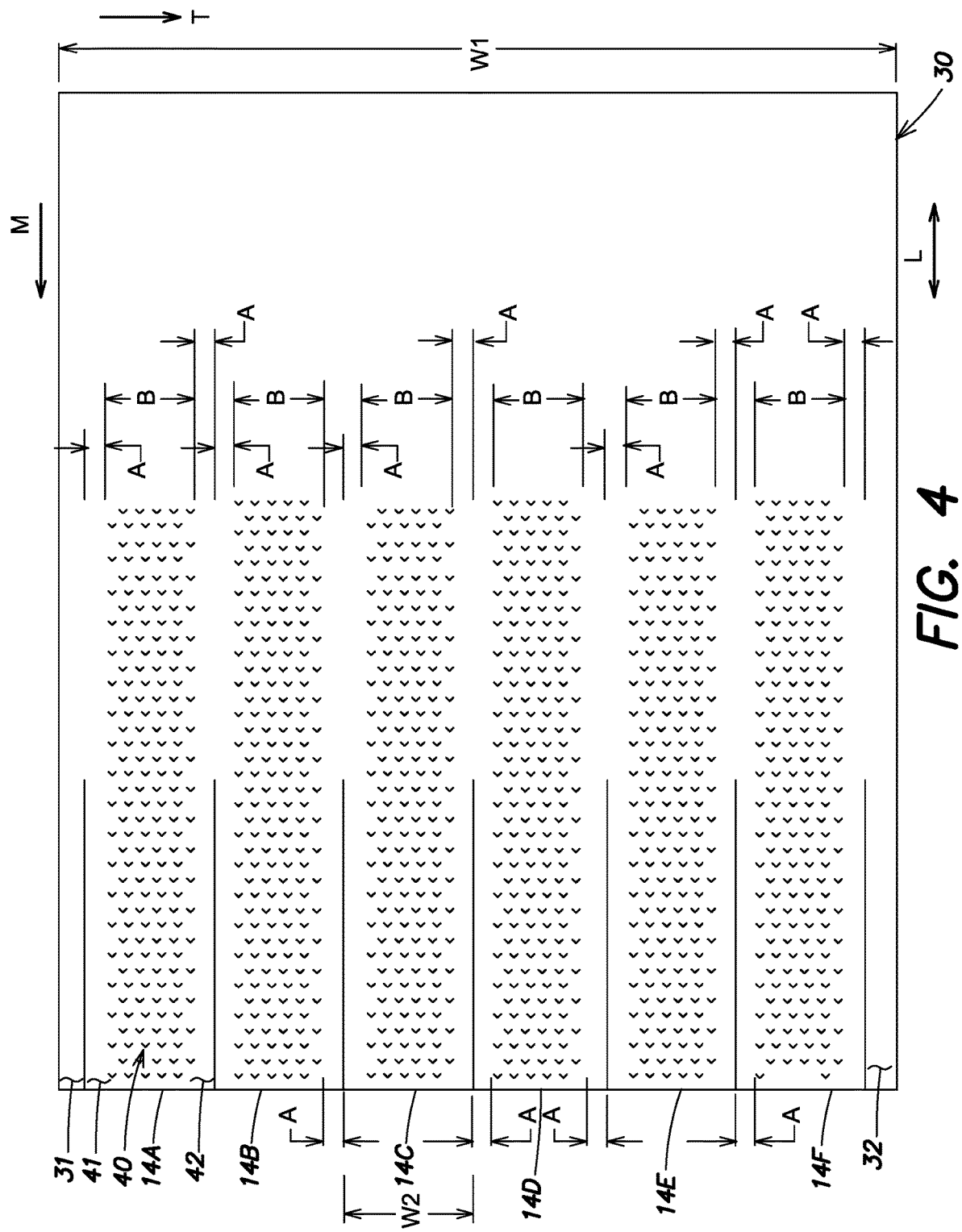
FIG. 4 is a top plan view of a master web of the lidding film prior to and after scoring and slitting to create multiple slit rows of scored lidding film according to one embodiment.

FIG. 3 illustrates a schematic view of one apparatus and process for scoring and slitting a master web 30 of lidding film being unwound from a master roll unwound unit 50 in order to generate multiple individual scored and slit rolls of lidding film. FIG. 4 illustrates a length of the master web 30 during the scoring and slitting process illustrated in FIG. 3. The master web of lidding film 30 has an initial width W1 in a direction transverse T to the machine direction M (the machine direction being the direction in which the web 30 is advanced through the scoring and slitting apparatus). In this example, the master web 30 (shown moving to the left in FIGS. 3-4) will be first scored by scoring unit 52 (FIG. 3). The scored web is then slit by slitting station 54 (FIG. 3). The result is six individual scored and slit rolls 14A-F of lidding film. Each scored and slit roll is then rewound onto a separate core at rewind station 56 (only two of six cores are shown in cross section).

The film from the master web 30 after passing through the scoring and slitting stations 52, 54 includes non-scored outermost opposing edge trim areas 31, 32 (FIG. 4) along the length of the roll (in the M direction), and between those non-scored edges 31,32, six (6) equally sized individual lidding films 14A, 14B, 14C, 14D, 14E, 14F. Each individual lidding film 14A-F of width W2 has a central scored area 40 of width B for forming the scored lidding film of a blister package, and opposing non-scored edge grip areas 41, 42, each of width A. The edge grip areas 41, 42 extend along the longitudinal length L (same as machine direction M) of the film from the master web 30 that has been scored and split into individual rolls 14.

FIG. 5A is a top view of a length of one slit roll of lidding film (e.g. 14C), of width A+B+A, including central scored area 40 of width B, and two opposing non-scored edge grip areas 41, 42 each of width A. FIG. 5B shows a cross section of the slit roll, including outer layer 18 of thickness t1 and inner seal layer 17 of thickness t2. The total film thickness t3 is the sum of t1+t2. The scoring depth (SD) of the scored formations is also shown, extending only partially through the thickness t1 of the outer layer 18. The inner seal layer 17 is not scored.

As shown in FIG. 3, the master web 30 of lidding film is unrolled from a master roll unwind unit 50, and fed to a scoring station 52, where the web 30 is fed between two opposing rollers 53, 55, one roller 53 having formed thereon scoring surfaces 57 (see FIGS. 7A and 7B) for scoring the outer layer 18 of the web film 30 to form the scored central area 40 of width B, between two non-scored areas 41, 42 each of width A. After scoring, the scored web 30A advances in line to a slitting station 54 where the scored web 30A is slit into multiple slit rolls 30B, in this example into six individual slit rolls 14A-F, each slit roll 14 then being wound on a separate core as a separate roll 58, 59 at rewind station 56. The outermost non-scored trim edges 31, 32 of the master roll 30 are removed during the slitting process (at station 54), such that each of the six individual film rolls has the same width W2, including the central scored area 40 of width B and two opposing non-scored edges 41, 42 each of width A. The non-scored edges 41, 42 of each individual slit roll 30B provide structural integrity to prevent tearing of the rolls during the scoring, slitting, and winding/rewinding steps.

Figure 7A:
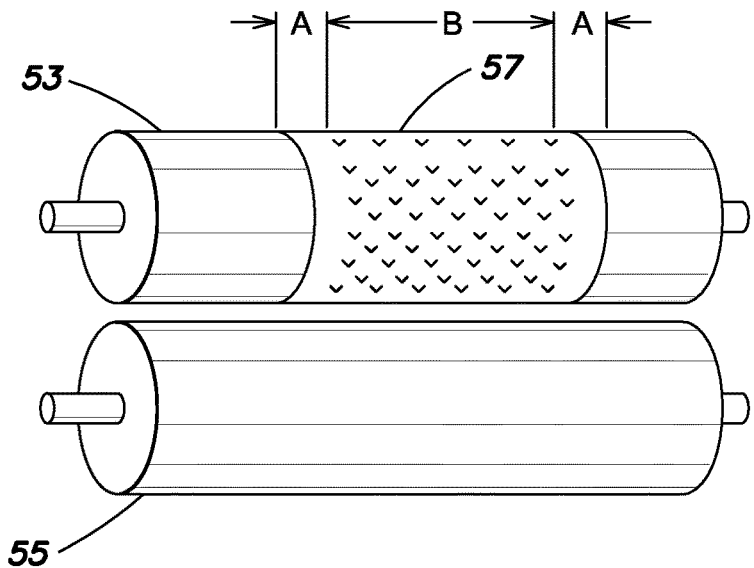
FIG. 7A is a perspective view of a first pair of scoring rollers for forming a scored lidding film according to one embodiment.
Figure 7B:
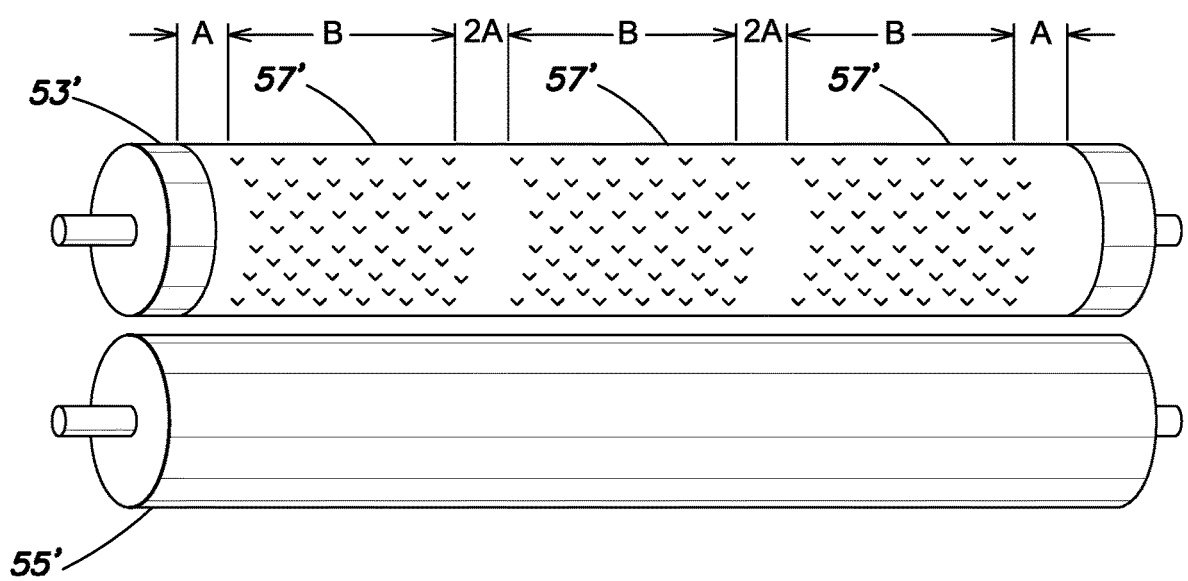
FIG. 7B is a perspective view of a second pair of scoring rollers for forming three scored central areas (for three blister packages) across the width of the scoring rollers.

The scored formations 23 are preferably formed on a continuous basis by a rotary die cut roller, such as scoring roller 53 shown in FIG. 7A. The scoring roller may have only a single width B of scoring to form lidding film for a single blister package 10, of width A+B+A. Alternatively as shown in FIG. 7B, the scoring roller may include multiple scoring areas, each of width B, for simultaneously forming multiple scored lidding films that are later slit to form multiple slit rolls of scored lidding film.

In the example of FIG. 3 showing a scoring station 52, the film is passed through the nip of a pair of opposing rollers 53, 55, one of which is a scoring roller 53. The opposing non-scoring roller 55 supports the web film as it passes against the scoring roller 53. Thus, as used herein passing against a scoring roller includes the use of one or multiple rollers.

After rewinding, each individual scored lidding film roll 58, 59, can be unwound from its core and aligned with a formed base substrate (filled with product) as shown in FIG. 1, for weld sealing the lidding film to the substrate to form the filled blister packages. In the present embodiment, the individual slit rolls form narrow rolls 14A-14F, each having a width adapted for a blister package. The slit rolls are then separately sealed to a series of base substrates during the inline forming and sealing operations, with the individual (or multiple) packages 10 then being cut from the series of sealed base substrates and lidding film formed inline in the machine direction. The non-scored edge areas 41, 42 of the lidding film and underlying base substrate are removed during the final die cutting of the individual blister packages as shown in the final step (cutting station 7) of FIG. 1.

In alternative embodiments, a scored and slit roll of lidding film may be wide enough to form multiple packages across the width of the lidding film. The drawings and specification have set forth a number of embodiments of the invention, which are intended to be descriptive only and not for the purpose of limitation. Variations will be apparent to those skilled in the art and are intended to be included in the scope of the present invention.

What is claimed is:

1. A multi-layer web comprising:
a multi-layer web of film windable on a core and adapted to be slit to form scored lidding film for blister packages, the film being formed without a metal layer and including an inner seal layer and an outer layer of different thermoplastic polymer materials,
the inner seal layer comprising a thermoplastic polymer material that softens at a lower melt temperature than the outer layer material in order to form a thermal weld seal with a base substrate of a blister package, the outer layer comprising a polyester material, including homopolymers, copolymers and blends thereof, that resists softening and maintains structural integrity of the film while the inner layer is softened to form the weld seal to the base substrate, and the outer layer has a scored area configured to rupture and release a product contained in a recess of a base substrate without breaking the weld seal,
the web being unwound from the core in a machine M direction transverse to a central longitudinal axis CL of the core on which the web is wound,
the scored area being sized to cover a plurality of recesses in a base substrate of a blister package and comprising a plurality of individual arrow shaped scored formations aligned in the M direction and spaced from one another, the scoring being uniformly distributed in the scored area, without the need for registering the scored formations with individual recesses in the machine M direction or a direction transverse thereto, and
the scored area being formed by passing the web against a scoring roller to mechanically score partially through the outer layer without scoring the inner seal layer, wherein the scoring depth is between 30% and 70% of the outer layer thickness, the inner seal layer comprises 5% to 30% of the total film thickness and the outer layer comprises 70% to 95% of the total film thickness, the total film thickness being of the multi-layer web of film, and the multi-layer web of film is from 20 to 80 micron in thickness.

2. A multi-layer web comprising:
a multi-layer web of film windable on a core and adapted to be slit to form scored lidding film for blister packages, the film being formed without a metal layer and including an inner seal layer and an outer layer of different thermoplastic polymer materials,
the inner seal layer comprising a thermoplastic polymer material that softens at a lower melt temperature than the outer layer material in order to form a thermal weld seal with a base substrate of a blister package, while the outer layer, comprising a polyester material, including homopolymers, copolymers and blends thereof, that resists softening and maintains structural integrity of the film while the inner layer is softened to form the weld seal to the base substrate, and the outer layer has a central scored area configured to rupture and release a product contained in a recess of a base substrate without breaking the weld seal,
the web being unwound from the core in a machine M direction transverse to a central longitudinal axis CL of the core on which the web is wound,
the central scored area extending in the machine M direction between opposing first and second non-scored edge grip areas aligned in the machine M direction, the central scored area being sized to cover a plurality of recesses in a base substrate of a blister package and comprising a plurality of individual arrow shaped scored formations aligned in the M direction and spaced from one another, the scoring being uniformly distributed in the central area in the machine M direction, without the need for registering the scored formations with individual recesses in the machine M direction,
the central scored area being formed by passing the web against a scoring roller to mechanically score partially through the outer layer without scoring the inner seal layer, wherein the scoring depth is between 30% and 70% of the outer layer thickness, the inner seal layer comprises 5% to 30% of the total film thickness and the outer layer comprises 70% to 95% of the total film thickness, the total film thickness being of the multi-layer web of film, and the multi-layer web of film is from 20 to 80 micron in thickness,
the opposing first and second edge grip areas being non-scored and each of a minimum width, transverse to the machine M direction, configured to provide structural integrity to the web during winding and unwinding of the web onto or from the core, and the non-scored edge grip areas being slittable to form a scored and slit lidding film for blister packages, the scored and slit lidding film having the central scored area between the first and second non-scored edge grip areas, wherein the central scored area comprises 75% to 99% of a total width of the slit lidding film and the remaining portions of the first and second non-scored edge grip areas together comprise 1% to 25% of the total width of the slit lidding film.

3. A scored and slit lidding film for blister packages which has been formed by slitting the multi-layer web of claim 2, wherein the scored and slit lidding film has the central scored area between remaining portions of the first and second non-scored edge grip areas, wherein the central scored area comprises 75% to 99% of a total width of the slit lidding film and the remaining portions of the first and second non-scored edge grip areas together comprise 1% to 25% of the total width of the slit lidding film.

4. A scored and slit lidding film of claim 3, wherein the central scored area comprises 80% to 99% of the total width of the slit lidding film.

5. A scored and slit lidding film of claim 3, wherein the central scored area comprises 85% to 99% of the total width of the slit lidding film.

6. A multi-layer web of claim 1 or claim 2, or a scored and slit lidding film of claim 3, wherein the scoring width is from 5 to 100 microns.

7. A scored and slit lidding film of claim 3, combined with a thermoformed base substrate, the inner layer being weld sealed to the base substrate.

8. A scored and slit lidding film and base substrate of claim 7, cut to form a single blister package.

9. A scored and slit lidding film and base substrate of claim 7, made from materials compatible in recycling.

10. A scored and slit lidding film and base substrate of claim 7, wherein the outer layer comprises semi-crystalline polyethylene terephthalate and the inner layer comprises an amorphous polyethylene terephthalate copolymer.

11. A multi-layer web of claim 1 or claim 2, or a scored and slit lidding film of claim 3, wherein the multi-layer web is formed by co-extrusion of the inner seal layer and outer layer, extrusion coating of the inner seal layer onto the outer layer, or coating of the inner seal layer onto the outer layer via solvent, water or solventless coating processes or by wet or dry bond lamination of the inner seal layer to the outer layer.

12. A multi-layer web of claim 1 or claim 2, or a scored and slit lidding film of claim 3, wherein the outer layer comprises polyethylene terephthalate, including homopolymers, copolymers and blends thereof.

13. A multi-layer web of claim 1 or claim 2, or a scored and slit lidding film of claim 3, wherein the inner layer comprises ethylene vinyl acetate, polyester, polyethylene, polypropylene, or acrylic, including homopolymers, copolymers and blends thereof.

14. A multi-layer web of claim 1 or claim 2, or a scored and slit lidding film of claim 3, wherein the outer layer comprises semi-crystalline polyethylene terephthalate and the inner layer comprises an amorphous polyethylene terephthalate copolymer.

15. A multi-layer web of claim 1 or claim 2, or a scored and slit lidding film of claim 3, wherein the outer layer comprises semi-crystalline polyethylene terephthalate.

* * * * *